United States Patent [19]

Barsotti

[11] 4,416,941
[45] Nov. 22, 1983

[54] ADDITIVE FOR COATING COMPOSITIONS OF SILICA AND A FLUORINATED ETHYLENE OXIDE POLYMER

[75] Inventor: Robert J. Barsotti, Franklinville, N.J.

[73] Assignee: E. I. Du Pont de Nemours & Co., Wilmington, Del.

[21] Appl. No.: 403,307

[22] Filed: Jul. 30, 1982

[51] Int. Cl.³ .................... C08K 3/08; C08K 3/36; C08G 12/32; B32B 27/42

[52] U.S. Cl. .................... 428/328; 428/329; 428/331; 428/422; 428/502; 524/366; 524/376; 524/441; 524/492; 524/512

[58] Field of Search ............ 524/441, 492, 512, 376, 524/366; 428/502, 331, 422, 328, 329

[56] References Cited

U.S. PATENT DOCUMENTS

| | | | |
|---|---|---|---|
| 3,607,822 | 9/1971 | Nishino | 260/37 |
| 3,630,954 | 12/1971 | Yates | 252/313 S |
| 3,674,734 | 7/1972 | Parker | 524/366 |
| 3,932,347 | 1/1976 | Cameldon et al. | 524/441 |
| 3,935,147 | 1/1976 | Godshal et al. | 428/141 |
| 4,164,488 | 8/1979 | Gregorovigh et al. | 524/512 |
| 4,238,387 | 12/1980 | Antonelli | 260/42.29 |
| 4,292,087 | 9/1981 | Bell | 524/441 |
| 4,330,458 | 5/1982 | Spinelli et al. | 524/512 |
| 4,338,379 | 7/1982 | Strolle et al. | 524/512 |
| 4,369,232 | 1/1983 | Scopazzi | 524/441 |

OTHER PUBLICATIONS

McCutcheons "Detergents & Emulsifiers" 1972 Annual, p. 73.
"Cab-O-Sil in Coatings"—Suppliers Literature of the Cabot Corporation, pp. 1–17.

Primary Examiner—Melvyn I. Marquis
Assistant Examiner—Herbert J. Lilling
Attorney, Agent, or Firm—Hilmar L. Fricke

[57] ABSTRACT

A rheology control additive of
(1) colloidal silica and
(2) a nonionic fluorocarbon polymer having ethylene oxide linkages and a weight average molecular weight of about 5,000–50,000 and contains about 2–25% by weight of fluorine; high solids coating compositions containing the additive have excellent rheology control and can be used as extension finishes on automobiles and trucks.

15 Claims, No Drawings

ADDITIVE FOR COATING COMPOSITIONS OF SILICA AND A FLUORINATED ETHYLENE OXIDE POLYMER

BACKGROUND OF THE INVENTION

This invention relates to a rheology control additive for high solids coating compositions.

Conventional coating compositions of a high molecular weight acrylic polymer and melamine crosslinking resins are well known in the art as shown by Vasta U.S. Pat. No. 3,622,651, issued Nov. 23, 1971; Hick U.S. Pat. No. 3,841,895, issued Oct. 15, 1974; Parker U.S. Pat. No. 3,674,734, issued July 4, 1972 and Parker U.S. Pat. No. 3,637,546, issued Jan. 25, 1972. These patents illustrate high quality coating compositions but have a relatively high solvent content to provide for good application properties and good properties of the resulting dried finish. To utilize these compositions in areas which have strict air pollution regulations, pollution abatement equipment is required. This equipment is expensive and increases capital investment of a plant and is costly to operate. Any attempt to reduce the solvent content of these conventional compositions generally results in finishes which have either a poor appearance or unacceptable properties or both.

In an effort to obtain high solids coating compositions that can be applied by conventional spraying techniques, the molecular weight of the polymer used in these compositions was reduced substantially and solvent content of the coating compositions was reduced. This reduction in molecular weight caused a problem of poor appearance, sagging of the finish on application, pulling away from edges after application and cratering of the finish. When aluminum flake pigments were used in these composition, poor appearance was caused by improper orientation of the aluminum flake in the finish.

There is a great need for a rheology control additive for high solids coating compositions that provides a reduced viscosity under typical spraying conditions when the coating composition is applied and that provides a substantially increased viscosity after application which prevents sagging and cratering of the resulting finish. Also, the additive should reduce pulling away of the finish from edges of a substrate to which the finish has been applied and should provide proper orientation of metallic flakes used in the coating. High solids coating compositions containing such an additive will have an overall appearance that is acceptable particularly for exterior finishes of automobiles and trucks.

SUMMARY OF THE INVENTION

The rheology control additive for high solids coating compositions consists essentially of about:

(1) 70-98% by weight, based on the weight of the rheology control additive, of colloidal silica and (2) 2-30% by weight, based on the weight of the rheology control additive, of nonionic fluorocarbon polymer that has ethylene oxide linkages and a weight average molecular weight of about 5,000–50,000 and contains about 2-25% by weight, based on the weight of the fluorocarbon polymer, of fluorine.

DESCRIPTION OF THE INVENTION

The rheology control additive contains about 70-98% by weight, based on the weight of the additive, of colloidal silica. Preferably, the colloidal silica is hydrophilic and has a particle size of about 0.2-1000 millimicrons and a surface area of about 50-1200 square meters per gram. The silica is usually about 99.8% silicon dioxide by weight (on a moisture free basis) and exists in three dimensional branched chain agregates and has a surface that is hydrophilic and capable of hydrogen bonding.

One particularly preferred silica is a colloidal fumed silica with a hydrophilic surface having a surface area of about 100-500 square meters per gram and a nominal particle size (assuming spherical particles) of about 5-20 millimicrons.

The rheology control additive contains in addition to the silica about 2-30% by weight of a nonionic fluorocarbon polymer having ethylene oxide linkages and a weight average molecular weight of about 5,000-50,000 and contains about 2-25% by weight, based on the weight of the fluorocarbon polymer, of fluorine. One preferred nonionic fluorocarbon polymer contains about 30-70% by weight of ethylene oxide linkages, 10-20% by weight of fluorine and has a weight average molecular weight of about 10,000-30,000.

One preferred rheology control additive contains about 90-95% by weight of colloidal fumed silica with a hydrophilic surface and a surface area of about 100-500 square meters per gram and 5-10% by weight of the above described preferred a nonionic fluorocarbon polymer.

The advantages of the rheology control additive in high solids coating compositions are as follows: the composition can be sprayed at a high solids level without sagging and running on the substrate to which it was applied; upon baking of the composition after application, the finish does not pull away from the edges of the substrate; craters are substantially reduced; the resulting finish has acceptable gloss and a good appearance and good metallic flake control. Also, the rheology control additive is stable in the composition.

Typical high solids coating compositions in which the rheology control additive is used have a binder content of film-forming constituents of about 40-70% by weight. The composition contains about 30-60% by weight of a liquid carrier which generally is solvent for the binder. In addition, the composition contains 0.1-10% by weight, based on the weight of the composition, of a rheology control additive. Usually, the composition contains about 0.1-30% by weight, based on the weight of the composition, of pigment.

The rheology control additive can be used in a wide variety of high solids coating compositions and provide the above advantages. Typical high solids coating compositions in which the rheology control additive can be used have as the binder of film-forming constituents the following: acrylic polymers with reactive groups such as hydroxyl, carboxyl, glycidyl or amide and a crosslinking resin such as an alkylated melamine resin or a polyisocyanate, a blend of acrylic and polyester resins and the aforementioned crosslinking resins, hydroxyl terminated polyester resin and the aforementioned crosslinking agents, epoxy resins or epoxy ester and alkylated melamine crosslinking resins, alkyd resins with or without drying oil groups which can be blended with alkylated melamine resins or polyisocyanate or other film-forming binders.

Preferably, the binder of the composition is an acrylic polymer having carboxyl, hydroxyl, amide or glycidyl groups and a number average molecular weight of about 500-30,000 and an alkylated melamine formaldehyde crosslinking agent. Generally, the composition contains about 0.1–2.0% by weight based on the weight of the binder, of an acid catalyst.

Typically useful acrylic polymers contain alkyl methacrylate, alkyl acrylate, hydroxy alkyl acrylate, hydroxy alkyl methacrylate and can contain styrene, acrylic acid or methacrylic acid. Amide monomers such as methacrylamide and acrylamide can be used, glycidyl monomers such as glycidyl acrylate or glycidyl methacrylate can also be used.

Preferred acrylic polymers are of an alkyl methacrylate that has 1–18 carbon atoms in the alkyl group, an alkyl acrylate that has 2–18 carbon atoms in the alkyl group and a hydroxy alkyl acrylate or a hydroxy alkyl methacrylate each having 2–4 carbon atoms in the alkyl group. To form an acrylic polymer which has a hydroxyl content of about 2–10% by weight, a sufficient amount of the aforementioned hydroxy alkyl acrylate or methacrylate is utilized. The polymer also can contain small amounts of ethylenically unsaturated carboxylic acid, such as acrylic acid, methacrylate acid, itaconic acid, in amounts of about 0.1–5% by weight.

Typical alkyl methacrylates and acrylates that can be used to prepare the acrylic polymers are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate and the like.

Adhesion promoting monomers can also be used in the acrylic polymers such as diethyl aminoethyl methyacrylate, tertiary butyl aminoethyl methacrylate, 3-(2-methacryloxy ethyl)-2,2-spiro cyclohexyl oxazolidene and the like.

Typical hydroxy alkyl acrylates and methacrylates which can be used to prepare the acrylic polymers are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate, and the like.

The acrylic polymers can contain about 0.1–30% by weight of other constituents such as acrylonitrile, methacrylonitrile, acrylamide and methacrylamide, styrene or substituted styrene such as methyl styrene.

The acrylic polymers utilized in the coating composition are prepared by solution polymerization in which the monomers are blended with solvent, polymerization catalyst and optionally, a chain transfer agent, and heated to about 75°–150° C. for 1–6 hours to form a polymer that preferably has a number average molecular weight of about 500–20,000, a hydroxyl content of 2–10% by weight and a glass transition temperature of about −20° C. to +25° C.

To form films that have acceptable physical properties from these relatively low molecular weight acrylic polymers, the polymers generally have a hydroxyl content that is about two to three times higher than acrylic polymers used for conventional thermosetting compositions. The higher hydroxyl content provides additional crosslinking sites and films are formed that have excellent physical properties that are equivalent to and ofter better than films from conventional thermosetting acrylic compositions.

The number average molecular weight of the acrylic polymers is determined by gel permeation chromatography using polymethylmethacrylate as a standard.

The glass transition temperature of the polymers is determined by differential scanning colorimetry or is calculated.

One technique that is successfully used in preparing the acrylic polymers is a programmed addition of monomers, solvent, catalyst solution and optionally a chain transfer agent into a polymerization vessel at a given rate. These programmed additions can be manually calculated or calculated by a computer. This allows for the molecular weight. Optionally, the polymers can be terminated with the chain transfer agent at the desired low molecular weight. Also, if required, after the polymerization is completed, solvents can be stripped off to increase the polymer solids content of the resulting polymer solution.

Typical solvents which are used to prepare the acrylic polymer are the following: toluene, ethyl acetate, acetone, methyl isobutyl ketone, methyl amyl ketone methyl ethyl ketone, ethyl alcohol, mineral spirits, ethylene glycol monoethyl ether acetate, and other aliphatic, cycloaliphatic and aromatic hydrocarbon, esters, ethers, ketones, and alcohols. These solvents can also be used to reduce the resulting coating composition to a spray viscosity.

About 0.1–4% by weight, based on the weight of the monomers, of the polymerization catalyst is used to prepare the acrylic polymer. Typical catalysts are: azo-bis-isobutyronitrile, azo-bis(gamma dimethyl valeronitrile), benzoyl peroxide, t-butyl pivalate and the like.

A chain transfer agent can be used to control the molecular weight of the acrylic polymer. Typical chain transfer agents are 2-mercapto ethanol, dodecyl mercaptan, benzene thioethanol, mercapto succinic acid, butyl mercaptan, lauryl mercaptan, mercapto propionic acid and the like. When a transfer agent is used, the resulting acrylic polymer contains about 0.5–10% by weight of a chain transfer agent.

An alkylated melamine formaldehyde crosslinking resin is used in the composition. The alkylated melamine formaldehyde resin used generally has 1–4 carbon atoms in the alkyl group. The resin is prepared by conventional techniques in which an alcohol such as methanol, ethanol, propanol, isopropanol, butanol, isobutanol, tertiary butanol and the like is reacted with a melamine formaldehyde resin. The resin can be monomeric or polymeric. One preferred resin which gives a high quality finish is hexamethoxymethyl melamine. Another useful resin is a methoxy/butoxymethyl melamine.

One particularly preferred high solids coating composition comprises about 40–70% by weight of a binder of film-forming constituents and a non-aqueous liquid carrier; in which the binder of film-forming constituents consist essentially of (A) about 5–45% by weight of a medium molecular weight acrylic polymer having a number average molecular weight, determined by gel permeation chromatography, of about 5,000–20,000, a hydroxyl content of about 2%–10% by weight, a glass transition temperature of about −20° C. to +25° C. and consists essentially of an alkyl methacrylate that has 1–18 carbon atoms in the alkyl group, a hydroxy alkyl acrylate, or a hydroxy alkyl methacrylate each having 2–4 carbon atoms in the alkyl group, and optionally, an alkyl acrylate that has 2–18 carbons in the alkyl group or styrene and (B) about 10-50% by weight of a low molecular weight acrylic polymer having a number average molecular weight determined as above of about 500-7,500, a hydroxyl content of about 2%-10% by weight, a glass transition temperature of about −20° C. to +25° C. and consists essentially of an alkyl methacrylate that has 1-18 carbon atoms in the alkyl group, a hydroxy alkyl acrylate, or a hydroxy alkyl methacrylate each having 2-4 carbon atoms in the alkyl group, and optionally, an alkyl acrylate that has 2-18 carbons in the alkyl group or styrene;

wherein the difference in molecular weight between the acrylic polymers is at least 3000; and (C) 25-45% by weight of alkylated melamine formaldehyde cross-linking resin having 1-4 carbon atoms in the alkyl group; and in addition to the above film-forming constituents contains about 0.1-2.0% by weight of an acid catalyst.

Useful acrylic polymers for this preferred composition contain about 15-82% by weight of an alkyl methacrylate that has 1-4 carbon atoms in the alkyl group, preferably methyl methacrylate, 2-50% by weight of an alkyl acrylate that has 2-12 carbon atoms in the alkyl group and 16-35% by weight of a hydroxyl alkyl acrylate or a hydroxyl alkyl methacrylate each having 2-4 carbon atoms in the alkyl group. These polymers can contain up to 30% by weight of styrene which replaces a portion of the alkyl methacrylate. Also these polymers can contain an ethylenically unsaturated carboxylic acid.

Particularly useful acrylic polymers for this preferred composition comprises about 10-20% by weight styrene, 10-20% by weight methyl methacrylate, 35-48% by weight butyl acrylate, 20-30% by weight hydroxyl ethyl acrylate and 0.1-5% by weight of acrylic acid and have a number average molecular weight of 1,500-10,000. Preferred acrylic polymers of the above type contains about 16% styrene, 15.8% methyl methacrylate, 43% butyl acrylate, 25% hydroxy ethyl acrylate and 0.2% acrylic acid. Another useful acrylic polymer contains abut 29% styrene, 21% methyl methacrylate, 32% butyl acrylate, 17% hydroxy ethyl acrylate and 1% acrylic acid.

Preferred medium molecular weight acrylic polymers have a number average molecular weight of about 5,000-10,000 and low molecular weight acrylic polymers have a number average molecular weight of about 1,500 to 4,000.

The aforementioned composition can contain pigments. These pigments can be introduced into the composition by first forming a mill base with the acrylic polymer utilized in the composition or with other compatible polymers or polymeric dispersants by conventional techniques, such as sand-grinding, ball milling, attritor grinding, two roll milling to disperse the pigments. The mill base is blended with the film-forming constituents as shown in the following Examples.

Any of the conventional pigments used in the coating compositions can be utilized in this composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic dyes.

Metallic flake pigments such as aluminum flakes are used alone as with the aforementioned pigments in the coating compositions. Generally, about 0.1-5% by weight based on the weight of the binder, of these metallic flake pigments are used.

Also, in addition to the above constituents, plasticizers in the amounts of 0.1-10% by weight, based on the weight of the binder, can be used in the composition. Plasticizers that can be used, are for example, butyl benzyl phthalate, dibutyl phthalate, triphenyl phosphate, 2-ethylhexyl benzyl phthalate, dicyclohexyl phthalate, diallyl phthalate, dibenzyl phthalate, butylcyclohexyl phthalate, mixed benzoic acid esters, fatty oil acid esters of pentaerythritrol, poly-(propylene adipate)dibenzoate, diethylene glycol dibenzoate, tetrabutylthiodisuccinate, butylphthalylbutyl glycolate, acetyltributyl citrate, dibenzylsebacate, tricresyl phosphate, toluene ethyl sulfonamide, and dimethylene cyclohexyl phthalate.

An acid catalyst solution can be added to the coating composition to increase the rate of crosslinking of the composition on curing. Generally, about 0.1-2% by weight, based on the weight of the binder, of acid catalyst is used. For example, phosphoric acid or an alkyl acid phosphate in which the alkyl groups has 1-12 carbon atoms can be utilized for this purpose. Typical alkyl acid phosphates are methyl acid phosphate, ethyl acid phosphate, propyl acid phosphate, lauryl acid phosphate, and the like. Sulfonic acid or a substituted sulfonic acid can be used such as para-toluene sulfonic acid.

Adducts of the aforementioned acids also can be used as catalysts. For example, epoxy resins reacted with phosphoric acid or an alkyl acid phosphate or with a substituted sulfonic acid such as paratoluene sulfonic acid are useful. Typical epoxy resins that can be used to form these adducts are "Epon" 828, 1002, 1003, 1004 which are the condensation products of epichlorohydrin and bisphenol A. Other compounds can be used to form adducts of these acids such as alkyl oxazolidine, e.g., dimethyl oxazolidine.

To improve weatherability of finishes of the coating compositions, about 0.1-10%, by weight, based on the weight of the binder, of an ultraviolet light stabilizer or a combination of ultrviolet light stabilizers can be added. Also, about 0.1-5% by weight, based on the weight of the binder, of an antioxidant can be added. Weatherability of finishes of coating compositions containing aluminum flake are particularly enhanced by the addition of ultraviolet light stabilizers and antioxidants. Also, about 0.1-10% by weight, based on the binder, of iron pyrophosphate can be added with ultraviolet light stablizers and antioxidants to improve weatherability of finishes. Typically useful ultraviolet light stabilizers and antioxidants are disclosed hereinafter.

The coating composition containing the rheology control additive of this invention can be applied over a variety of substrates, such as metal, wood, glass, plastics, and the like, by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are baked at relatively low temperatures of about 65°-140° C. for about 15 minutes, 2 hours. The resulting finish is about 0.1-5 mils thick but for most uses, a 1-3 mil thick finish is used. One technique that is used to insure that there will be no popping or cratering of the finish is to allow the solvents to flash off for about 15–30 seconds before a second coating is sprayed on or otherwise applied, then waiting for about 2–10 minutes before baking the coating to allow any residual solvents to flash off. The resulting finish has good gloss and can be rubbed or polished with conventional techniques to improve the smoothness, appearance and gloss. The finish has good adhesion to substrates of all types, is hard and resistant to weathering, solvents, alkali, scratches and the like. These characteristics make the composition particularly useful as a finish for automobiles, trucks, airplanes, railroad equipment machines, outdoor equipment such as bridges, water tanks, gas tanks and the like.

Another aspect of this invention is to utilize the coating composition containing the rheology control additive as a clear coat/color coat finish for substrates. In this finish, a clear coat top layer is in firm adherence to a color coat layer that is in adherence with a substrate. The clear coat is a transparent film of the coating composition and the color coat is the coating composition containing pigments in a pigment to binder ratio of about 1/100 to 150/100 and other additives.

Optionally, the color coat can contain about 0.1–10% by weight, based on the weight of the binder of the color coat, of an ultraviolet light stabilizer. Another option is that the color coat and the clear coat each can contain about 0.1–10% by weight, based on the weight of the binder of the coat, of an ultraviolet light stabilizer. Also, the clear coat or the color coat can contain about 0.1–5% by weight, based on the weight of the binder of the coat, of an antioxidant. When an antioxidant is used, the ratio of ultraviolet light stabilizer to antioxidant is about 1:1 to about 50:1.

Preferred, to form a durable finish, both the clear coat and the color coat contain about 5–8% by weight of an ultraviolet light stabilizer and optionally, about 0.1–1% by weight of the antioxidant and the ratio of ultraviolet light stabilizer to antioxidant is about 10:1.

Iron pyrophosphate can be added to either the clear coat or color coat or both in the aforementioned amounts to enhance weatherability of the clear coat/color coat finish.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 0.8–1.5 mils thick. Any of the aforementioned conventional pigments can be used in the color coat including metallic flake pigments can be used. The clear coat can also contain transparent refractive index as the binder of the clear coat and are of a small particle size of about 0.015–50 microns. Typical pigments that can be used in a pigment to binder weight ratio of about 1/100 to silica pigments. These pigments have a refractive index of about 1.4–1.61.

Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazines such as 2-phenyl-4-(2',4'-dihyroxylbenxoyl)-triazoles, 2-[hydroxy-3',5'-(1,1-dimethylpropyl)-phenyl]benzotriazole, substituted benzotriazoles such as hydroxy-phenyltriazoles and the like.

Triazines such as 3,5-dialkyl-4-hydroxy-phenyl derivatives of triazine, sulfur containing derivatives of dialyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl) benzene, metal derivatives of 3,5-di-t-butyl-4-hydroxy phenyl propionic acid, asymmetrical oxalic acid diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

Typical antioxidants that are useful are as follows: tetrakis alkylene (di-alkyl hydroxy aryl)alkyl ester alkanes such as tetrakis methylene 3(3',5'-dibutyl-4'hydroxyphenyl)propionate methane, reaction product of p-amino diphenylamine and glycidyl methacrylate, reaction product of n-hexyl-N'-phenyl-p-phenylene diamine and glycidyl methacrylate, pentaerythritol tetrakis-(thioglycolate), trimethylol propane tris(trioglycolate), trimethylol ethane tris-(thioglycoate), N-(4-anilino phenyl) acrylamide and the like.

One preferred combination of ultraviolet light stabilizer and antioxidant is 2-hydroxy-4-dodecyloxy benzophenone or a substituted 2(2-hydroxyphenyl) benzotriazole and tetrakis methylene 3(3',5'-dibutyl-4'hydroxyphenyl) propionate methane.

The clear coat/color coat finish is applied by conventional spraying techniques and preferably the clear coat is applied to the color coat while the color coat is still wet. Other conventional application techniques can be used such as brushing, roller coating, electrostatic spraying and the like. The finish is then dried at ambient temperatures or can be used as indicated above.

The following examples illustrate the invention. All parts and percentages are on a weight basis unless otherwise indicated. Molecular weights are determined by gel permeation chromatography.

EXAMPLE 1

A white paint was formulated by blending together in a conventional mixing vessel the following constituents in the order shown:

| | Parts By Weight |
|---|---|
| Ultraviolet light stabilizer solution (25% solid of 2-[2,-hydroxy-3',5'-(1,1-dimethylpropyl)phenyl]benzotriazole) | 5.75 |
| Xylene | 2.68 |
| Ethyl Acetate | 5.46 |
| Hydrophilic Silica Dispersion (8.9% fumed colloidal hydrophilic silica having a surface area of 200 square meters per gram and an average diameter of 120 millimicrons, 49% of a fully methylated/butylated melamine formaldehyde resin 42.1% by weight of ethylene glycol mono-butyl ether) | 6.70 |
| White Pigment Dispersion (70% titanium dioxide pigment, 14% acrylic resin described below, 16% methyl amyl ketone) | 26.31 |
| Modaflow solution (10% solids of an acrylic polymer of ethyl acrylate/ | 0.31 |

| | Parts By Weight |
|---|---|
| 2 ethyhexyl acrylate in xylene) | |
| Fully methylate/butylated melamine formaldehyde resin | 13.40 |
| Acrylic resin solution (75% solids in methyl amyl ketone in which the acrylic polymer is of styrene, methylmethacrylate, n-butyacrylate, hydroxy ethyl acrylate, acrylic acid in a weight ratio of about 29/21/32/17/1 having a number average molecular weight of about 6000) | 36.34 |
| Methanol | 0.60 |
| Nonionic fluorocarbon polymer solution (10% polymer solids in methyl amyl ketone of a nonionic fluorocarbon polymer having about 50% by weight of ehtylene oxide linkage and containing about 10–20% by weight fluorine and having a molecular weight of about 20,000 a number average molecular weight of about 4,400 and a molecular weight distribution of about 46,000). | 0.30 |
| Dimethyl oxazoline solution (65% solids in methanol) | 0.44 |
| Paratoluene sulfonic acid solution (33% solids in methanol) | 0.88 |
| Total | 100.17 |

The above white paint was reduced to a 40 second Fisher No. 2 cup viscosity with a mixture of xylene and ethyl acetate. The reduced paint was electrostatically sprayed with a Minibell electrostatic Spray Gun on a phosphatized steel panel coated with an alkyd resin primer and baked for 30 minutes at about 125° C. The resulting paint had a high gloss, a dry paint film thickness of about 2 mils and did not sag or pull away from the edge of the panel and had a minimum number of craters.

A second coating of the resulting paint was sprayed onto a separate phosphatized and primed steel panel and baked as above to provide a film about 3.5 mils thick which had excellent gloss, did not sag or pull away from the edges of the panel and had a minimum amount of cratering.

A white paint was prepared using the same constituents and amounts as above except the nonionic fluorocarbon solution was omitted. The paint was reduced to a spray viscosity as above, spray applied as above onto a separate steel panel phosphatized and primed as above and baked as above to provide a 2 mil thick finish. The resulting panel had an unacceptable finish because the finish had an excessive number of craters, showed severe pulling away from the edges of the panels and sagged. A thick film (3.5 mils dry film thickness) was applied as above to a separate primed and phosphatized steel panel and had the same unacceptable properties including severe sagging of the finish.

EXAMPLE 2

A dark blue metallic paint was formulated by blending the following constituents together in the order shown in a mixing vessel.

| | Parts By Weight |
|---|---|
| Xylene | 3.65 |
| Butyl acetate | 1.41 |
| Ethyl acetate | 3.70 |
| Amyl acetate | 7.47 |
| U. V. stabilizer and Antioxidant solution (24.2% of 2-[2'-hydroxy-3', 5'-(1,1-dimethylpropyl)phenyl] benzotriazole, 0.8% tetrakis[methylene 3-(3',5'-di-t-butyl-4'-hydroxyphenyl) propionate]methane 75% toluene) | 6.48 |
| Blue Pigment Dispersion (8.0% phthalocyanine blue pigment, 55.78% acrylic polymer described in Example 1 and 35.72% amethyl amyl ketone) | 11.19 |
| Violet Pigment Dispersion 13/52% "Monastrol Violet R Pigment, 46.49% acrylic polymer described in Example 1, and 39.98% methyl amyl ketone) | 2.58 |
| Hydrophilic Silica dispersion (described in Example 1) | 5.89 |
| Fully methylated/butylated melamine formaldehyde resin | 15.67 |
| Iron pyrophosphate dispersion (22.2% iron pyrophosphate 39.64% acrylic polymer described in Example 1 and 38.16% methyl amyl ketone) | 3.53 |
| Medium coarse Aluminum Flake Dispersion (24% aluminum flake 33.81% medium molecular weight acrylic resin-described below, 42.19% methyl amyl ketone) | 0.35 |
| Medium Aluminum Flake Dispersion (25% aluminum flake 30.27% acrylic resin above and 43.73% methyl amyl ketone) | |
| Medium Molecular Weight Acrylic Resin solution (60% solids acrylic resin of styrene, methylmethacrylate, butyl acrylate, hydroxyethyl acrylate, acrylic acid in a 29/21/32/17/1 weight ratio having a number average molecular weight of 15,000 in a mixture of solvents of alkphatic solvent, butanol, ethylene glycol monoethyl ether acetate, butylacetate) | 12.72 |
| Acrylic resin solution (described in Example 1) | 21.35 |
| Nonionic fluorocarbon polymer solution (described in Example 1) | 0.24 |
| Methanol | 2.00 |
| Dimethyl oxazoline solution (65% solids in methanol) | 0.35 |
| Paratoluene sulfonic acid solution (33% solids in methanol) | 0.47 |
| Total | 99.17 |

The above paint was reduced to a 40 second Fisher No. 2 cup viscosity with a mixture of xylene and ethyl acetate. The reduced paint was electrostatically sprayed 2 passes with a Minibell Electrostatic Spray Gun on a phosphatized steel panel coated with an alkyd resin primer and one pass with a conventional spray gun using air atomization. The painted panel was baked for 30 minutes at about 125° C. The resulting paint had a high gloss, good metalic flake control, a dry paint film thickness of about 2 mils and did not sag or pull away from the edge of the panel and had a minimum amount of craters.

A second coating of the above paint was sprayed onto a separate phosphatized and primed steel panel and baked as above to provide a film about 3.5 mils thick which had acceptable gloss, did not sag or pull away from the edges of the panel and had a minimum amount of cratering.

A paint was prepared using the same constituents and amounts as above except the nonionic fluorocarbon solution was omitted. The paint was reduced to a spray viscosity as above, spray applied as above, onto a separate steel panel phosphatized and primed as above and baked as above, to provide a 2 mil thick finish. The resulting panel had an unacceptable finish because the finish had an excessive number of craters, poor metallic flake control, showed a severe amount of pulling away from the edges of the panel and severe sagging. A thick film (3.5 mils dry film thickness) was applied as above to a separate primed and phosphated steel panel and had the same unacceptable properties including severe sagging.

EXAMPLE 3

A light blue metallic paint was formulated by blending the following constituents together in the order shown:

|  | Parts By Weight |
|---|---|
| Xylene | 2,86 |
| U. V. stabilizer and antioxidant solution (described in Example 2) | 6.05 |
| Buytl acetate | 3.71 |
| Ethylene glycol monobutyl ether | 3.21 |
| Blue Pigment Dispersion (described in Example 2) | 2.04 |
| Blue Pigment Dispersion 12% phthalocyamine blue pigment 48%, acrylic polymer described in Example 1 and 40% methyl amyl lactone) | 0.63 |
| Hydrophilic Silica dispersion (described in Example 1) | 10.2 |
| Fully methylated/butylated melamine formadehyde resin | 13.82 |
| Medium Aluminum Flake Dispersion (described in Example 2) | 7.31 |
| Medium Molecular Weight Acrylic Resin Solution (described in Example 2) | 8.92 |
| Iron pyrophosphate dispersion (described in Example 2) | 2.82 |
| Acrylic Resin solution (described in Example 1) | 29.98 |
| Methanol | 1.05 |
| Butanol | 0.92 |
| Ethyl Acetate | 5.16 |
| Nonionic fluorocarbon polymer solution (described in Example 1) | 0.46 |
| Dimethyl oxazoline solution (65% solids in Methanol) | 0.39 |
| Paratoluene sulfonic Acid solution (33% solids in Methanol) | 0.44 |
| Total | 99.95 |

The above paint was reduced to a 40 second Fisher No. 2 cup viscosity with a mixture of xylene and ethyl acetate. The reduced paint was sprayed as in Example 2 on a phosphatized steel panel coated with an alkyd resin primer and then baked for 30 minutes at about 125° C. The resulting paint had a good gloss, a dry paint film thickness of about 2 mils and did not sag or pull away from the edge of the panel and had a minimum number of craters.

A second coating of the above paint was sprayed as above onto a separate phosphatized and primed steel panel and baked as above to provide a film about 3.5 mils thick which had good gloss, did not sag or pull away from the edges of the panel and had a minimum number of craters.

A paint was prepared using the same constituents and amounts as above except the nonionic fluorocarbon solution was omitted. The paint was reduced to a spray viscosity as above, spray applied as above, onto a separate steel panel phosphatized and primed as above and baked as above to provide a 2 mil thick finish. The resulting panel had an excessive number of craters, showed a severe amount of pulling away from the edges of the panel and sagged. A thick film (3.5 mil dry film thickness) was applied as above to a separate primed and phosphated steel panel and had the same unacceptable properties including excessive sagging.

I claim:

1. A coating composition comprising about 40–70% by weight of a binder of film forming constituents and about 30–60% by weight of a nonaqueous liquid carrier, wherein the binder comprises a film-forming acrylic polymer containing polymerized alkyl methacrylate and alkyl acrylate monomers and having reactive carboxyl groups, hydroxyl groups, amide groups, glycidyl groups or a mixture of any of these groups and an alkylated melamine formaldehyde crosslinking agent; and in addition the composition contains about 0.1–10% by weight, based on the weight of the binder, of a rheology control additive consisting essentially of about
   (1) 70–98% by weight, based on the weight of the rheology control additive, of colloidal hydrophilic fumed silica having a surface area of about 100–500 square meters per gram and a particle size of about 5–20 millimicrons and
   (2) 2–30% by weight, based on the weight of the rheology control additive, of a nonionic fluorocarbon polymer having ethylene oxide linkages and a weight average molecular weight of about 5,000–50,000 and containing about 2–25% by weight, based on the weight of the fluorocarbon polymer, of fluorine.

2. The coating composition of claim 1 which contains about 0.1–5% by weight of metallic flake pigment.

3. The coating composition of claim 2 which contains about 0.1–5% by weight of metallic flake pigment.

4. The coating composition of claim 3 in which the metallic flake pigment is aluminum flake.

5. The coating composition of claim 1 in which the film-forming resin is an acrylic resin comprising an alkyl methacylate, an alkyl acrylate, a hydroxy alkyl methacrylate or a hydroxy alkyl acylate, an alkylated melamine formaldehyde resin and contains in addition to the binder about 0.1–2.0%, based on the weight of the binder of an acid catalyst.

6. The coating composition of claim 5 in which the binder consists essentially of
   (a) about 5–45% by weight of a medium molecular weight acrylic polymer having a number average molecular weight, determined by gel permeation chromotography, of about 5,000–20,000, a hydroxyl content of about 2–10% by weight, a glass transition temperature of about −20° C. to +25° C. and consisting essentially of methyl methacrylate, an alkyl methacrylate or an alkyl acrylate each having 2–18 carbon atoms in the alkyl group and a hydroxyl alkyl acrylate or a hydroxy alkyl methacrylate each having 2–4 carbon atoms in the alkyl group;
   (b) about 10–50% by weight of a low molecular weight acrylic polymer having a number average molecular weight determined as above of about 500–700, a hydroxyl content of 2–10% by weight, a glass transition temperature of about −20° C. to +25° C. and consisting essentially of methylmethacrylate or an alkyl methacrylate or an alkyl acrylate each having 2-18 carbon atoms in the alkyl group and a hydroxy alkyl acrylate or a hydroxy alkyl methacrylate each having 2-4 carbon atoms in the alkyl group; and wherein the difference in molecular weight between the acrylic polymers is at least 3000; and (c) about 25-45% by weight of an alkylated melamine formaldehyde cross-linking agent having 1-4 carbon atoms in the alkyl group.

7. The coating composition of claim 6 in which the acrylic polymers contain about 0.1-30% by weight of styrene.

8. The coating composition of claim 6 or 7 in which the cross-linking agent is methylated/butylated melamine formaldehyde resin.

9. The coating composition of claim 8 in which the catalyst is an alkyl acid phosphate, phosphoric acid, paratoluene sulfonic acid or an adduct of either of said acids.

10. The coating composition of claim 9 in which the catalyst is an adduct of paratoluene sulfonic acid and an alkyl oxazolidine.

11. The coating composition of claim 6 containing about 0.1-10% by weight, based on the weight of the binder, of an ultraviolet light stabilizer.

12. The coating composition of claim 6 containing about 0.1-5% by weight, based on the weight of the binder, of an antioxidant.

13. The coating composition of claim 6 containing about 0.1-10% by weight, based on the weight of the binder, of iron pyrophosphate.

14. A substrate having a cured finish of the composition of claim 1 firmly adhered thereto.

15. A substrate having a color coat of the coating composition of claim 2 and a clear coat firmly adhered to the color coat of the coating composition of claim 10 wherein both the color coat and clear coat are baked to form a cured finish.

* * * * *